(12) United States Patent
Bazzo

(10) Patent No.: US 9,919,462 B2
(45) Date of Patent: Mar. 20, 2018

(54) MOLDING APPARATUS AND METHOD FOR PRODUCING ARTICLES MOLDED THROUGH SEQUENTIAL INJECTION

(71) Applicant: INGLASS S.p.A., San Polo di Piave (IT)

(72) Inventor: Maurizio Bazzo, San Polo di Piave (IT)

(73) Assignee: INGLASS S.p.A., San Polo di Piave (Treviso) (IT)

(*) Notice: Subject to any disclaimer, the term of this patent is extended or adjusted under 35 U.S.C. 154(b) by 170 days.

(21) Appl. No.: 14/961,173

(22) Filed: Dec. 7, 2015

(65) Prior Publication Data

US 2016/0167264 A1 Jun. 16, 2016

(30) Foreign Application Priority Data

Dec. 10, 2014 (IT) .......................... TO2014A001021

(51) Int. Cl.
| | |
|---|---|
| *B29C 45/76* | (2006.01) |
| *B29C 45/00* | (2006.01) |
| *B29L 31/30* | (2006.01) |
| *B29C 45/28* | (2006.01) |
| *B29C 45/77* | (2006.01) |

(52) U.S. Cl.
CPC ...... *B29C 45/0025* (2013.01); *B29C 45/0046* (2013.01); *B29C 45/762* (2013.01); *B29C 45/281* (2013.01); *B29C 45/77* (2013.01); *B29C 2045/0032* (2013.01); *B29C 2945/76648* (2013.01); *B29C 2945/76755* (2013.01); *B29C 2945/76859* (2013.01); *B29C 2945/76862* (2013.01); *B29L 2031/3044* (2013.01)

(58) Field of Classification Search
CPC .. B29C 2045/0032; B29C 2945/76648; B29C 45/0046
See application file for complete search history.

(56) References Cited

U.S. PATENT DOCUMENTS

| | | | |
|---|---|---|---|
| 2006/0076710 A1* | 4/2006 | Rossanese | B29C 45/16 264/255 |
| 2012/0248644 A1* | 10/2012 | de Oliveira Antunes | B29C 45/2703 264/40.5 |

FOREIGN PATENT DOCUMENTS

DE 102004031546 A1 2/2006

OTHER PUBLICATIONS

"Flexflow", Oct. 15, 2013 (Oct. 15, 2013), XP054975575, Retrieved from the Internet: URL:http://www.youtube.com/watch?v=G2-cv79Hpeg [retrieved on Oct. 27, 2014].

(Continued)

*Primary Examiner* — Jill L Heitbrink
(74) *Attorney, Agent, or Firm* — RMCK Law Group PLC

(57) ABSTRACT

A molding apparatus for the production of articles molded through sequential injection includes a mold having a cavity, a plurality of electrically actuated injectors arranged at central, intermediate and end positions, respectively, with respect to the mold cavity, and an electronic system for controlling the injectors for the actuation thereof according to a sequential cycle which provides for opening the central injector first, followed by the intermediate injectors and then the end injectors. The electronic control system is configured so that the opening sequential cycle occurs in such a way to obtain more linear and homogeneous pressure in the mold filling step, and lower packing pressure.

19 Claims, 3 Drawing Sheets

(56) References Cited

OTHER PUBLICATIONS

"The new FLEXflow Accurate, stable and easy-to-use Servo-Driven valve gate for top quality. What You Have Always Dreamed of Only Better", Oct. 9, 2014 (Oct. 9, 2014), XP055205110, www.hrsflow.com Retreieved from the Internet: URL:http://www.hrsflow.com/DownLoadFileUrl.php?url=backend@@download@@file_upload@@allegato@@141009112811_1_flexflow_flyer_eng.pdf&nomefile=1_flexflow_flyer_eng.pdf [retrieved on Jul. 28, 2015] pp. 2-5.
Homes W: "Kaskadenspritzgiessen Vermeidet Bindenaehte", Kunstoffe, Carl Hanser Verlag, Munchen, DE, vol. 86, No. 9, Sep. 1, 1996 (Sep. 1, 1996), XP000627890, ISSN: 0023-5563.
Italian Search Report and Written Opinion for Italian Application No. ITTO20141021 dated Aug. 12, 2015, 10 pages.

* cited by examiner

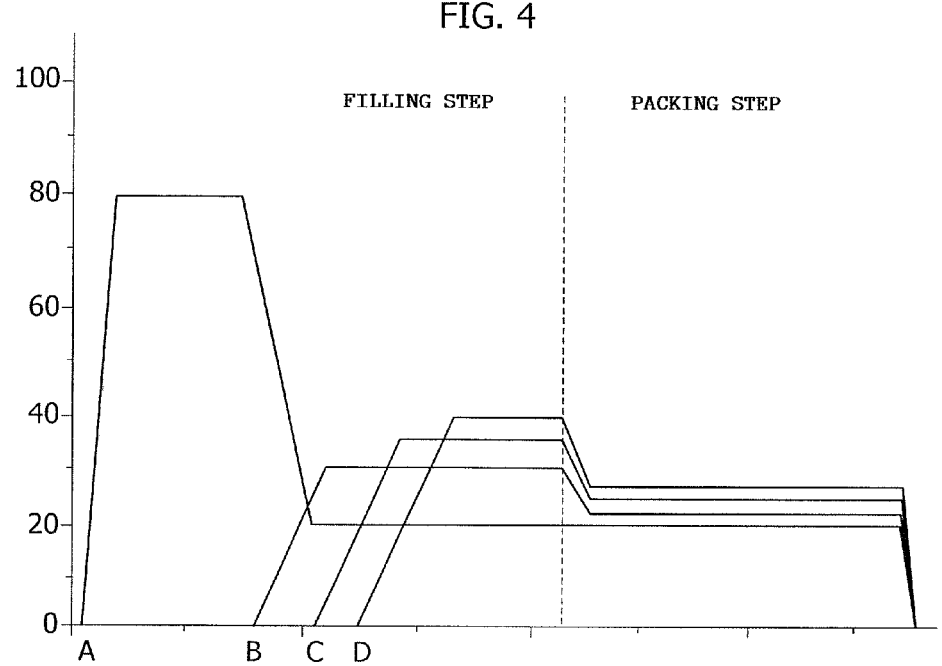
FIG. 4
FIG. 3
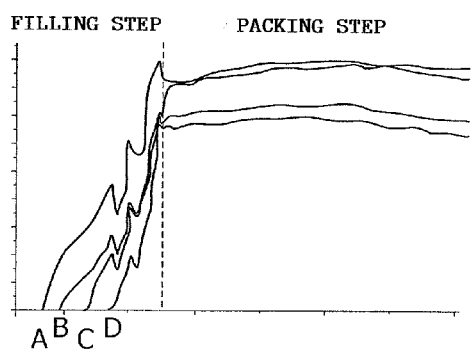
FIG. 5
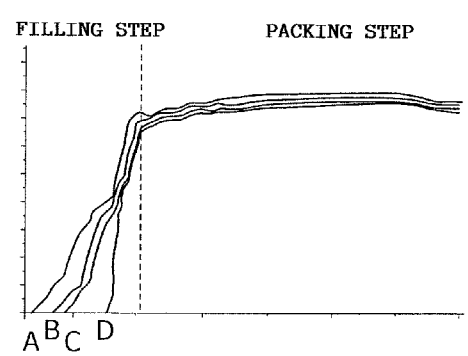

MOLDING APPARATUS AND METHOD FOR PRODUCING ARTICLES MOLDED THROUGH SEQUENTIAL INJECTION

CROSS REFERENCE TO RELATED APPLICATIONS

This application claims priority to Italian Patent Application No. TO2014A001021 filed on Dec. 10, 2014, the entire disclosure of which is incorporated herein by reference.

FIELD OF THE INVENTION

The present invention generally refers to the production of articles made of injection molded plastic material, and more particularly it regards a sequential injection molding apparatus.

Apparatus thus made comprise a mold having a cavity, a plurality of injectors respectively arranged in central, intermediate and end positions with respect to the mold cavity and whose actuation occurs according to a sequential cycle which provides for opening the central injector first, followed by the intermediate injectors and then the end injectors. The injectors, of the shutter type, are formed by a nozzle within which a shutter pin, which controls the introduction of the plastic material coming from a distributor, can be axially moved in the mold cavity.

In the injection molding industry substantial changes regarding the actuation of the shutter pin of each injector are currently in progress: as a matter of fact there is an ever increasing use of electrical actuators, instead of the usual fluid actuators, controlled through an electronic control system which allows varying both the position and movement speed of the shutter pin of the injector with maximum accuracy. Examples injectors thus made are described and illustrated, for example, in the European patent EP-2679374A1 on behalf of the Applicant.

STATE OF THE PRIOR ART

FIG. 1 of the attached drawings schematically represents an article that can be obtained through sequential injection molding, for example constituted by a considerably large body such as for example a motor vehicle spoiler S. The shape of the spoiler S obviously corresponds to the mold cavity, and the injectors used for the sequential injection are respectively indicated with A, the central injector, i.e. for the injector positioned at the centerline of the mold cavity, with B-C the intermediate injectors positioned at a progressive distance from the central injector A towards the sides of the cavities, and with D the end injectors arranged in proximity of the ends of the cavity.

FIG. 2 is a diagram showing an example of the conventional sequential injection process method for producing the article S: the charts show, as a function of time, the position assumed by the shutter pins of the central injector A, the intermediate injectors B-C and the end injectors D, respectively, expressed as a percentage, starting from the closing position "0", of the maximum opening position "100". As observable, the injectors are opened in a cascade fashion, for example but not necessarily at uniform intervals, starting from the central injector A and at the same speed up to complete opening (100%) during the cavity filling step. Upon reaching complete opening, all injectors are held in complete opening position up to the end of the packing step, before being simultaneously returned to the closing position.

FIG. 3 of the attached drawings shows, with reference to the conventional sequential injection carried out according to FIG. 2, the development—as a function of time—of the pressure detected in the mold cavity at the injectors A, B, C and D: as observable during the opening, corresponding to the filling of the mold cavity, non-homogeneous and considerable pressure variations occur. In the subsequent packing step, in which all the injectors are held in complete opening condition, the pressure corresponding to the central injector A and the intermediate injectors B, closer to the central one, is considerably higher than that of the other intermediate injectors C and the end injectors D.

This pressure development causes, at the end of the sequential injection cycle, the formation of anti-aesthetic surface defects on the molded article S, corresponding to the pressure lines.

SUMMARY OF THE INVENTION

The object of the present invention is to overcome the aforementioned drawbacks and thus improve the surface quality of the molded articles, making the pressure in the mold cavity more homogeneous and regular during the filling step and reducing them and making them uniform in the packing step.

According to the invention, this object is attained through a sequential injection molding apparatus of the type described above, characterized in that the electronic control system of the injectors is configured in such a way that:

the central injector is opened in a relatively rapid fashion up to a maximum opening value, then held at such maximum opening value, then partially closed up to a minimum opening value and held at such minimum opening value, the intermediate and end injectors, are opened in succession in a less rapid fashion up to respective maximum opening values lower than said maximum opening value of the central injector and higher than said minimum opening value of the central injector, then held at such respective maximum opening values, then closed partially up to respective minimum opening values higher than said minimum opening value of the central injector and held at such minimum opening value.

This solution idea allows attaining—in the various points of the mold cavity—greater regularity and homogeneity of pressure during the filling step as well as considerable reduction and uniformity of pressure during the packing step. Thus, this directly leads to practically eliminating the surface defects of the molded pieces caused by the pressure lines, thus obtaining better aesthetic quality, with the further advantage of allowing reducing—due to lower pressure during the packing step—the tonnage of the injection press and thus the material required for constructing the mold as a whole, without resulting in bowing.

In order to further improve these effects, the molding apparatus according to the invention may further provide for that the electronic control system of the injectors be also configured so as to operate the sequential cycle according to one or more of the further following characteristics:

the maximum opening value of the central injector is lower than the complete opening, the intermediate injectors and the end injectors are preferably, but not necessarily, opened in succession respectively during and after the partial closing of the central injector at said minimum opening value, the partial closing of the central injector from the maximum opening value to the minimum opening value is carried out in a less rapid fashion than the opening thereof at said maximum value, the opening of intermediate and end injectors at the respective maximum opening values is preferably, but not necessarily, carried out in a progressively more rapid fashion from the intermediate injectors to the end injectors, i.e. as the distance thereof from the central injector increases, the maximum opening values of the intermediate and end injectors preferably, but not necessarily, progressively increase from the intermediate injectors to the end injectors, i.e. as the distance thereof from the central injector increases also in this case, the minimum opening values of the intermediate and end injectors progressively increase from the intermediate injectors to the end injectors, i.e. as the distance thereof from the central injector increases also in this case.

The invention also regards a method implemented through the sequential injection apparatus.

BRIEF DESCRIPTION OF THE DRAWINGS

In the attached drawings:

FIG. 3 is a diagram representing the development of pressure in the mold cavity corresponding to the sequential injection according to the prior art of FIG. 2, FIG. 4 is a diagram similar to FIG. 2 showing the sequential injection cycle method according to the invention, FIG. 5 is a diagram similar to FIG. 3 referring to the sequential cycle according to FIG. 4, and FIG. 6 compares the development of the packing pressure respectively corresponding to the sequential injection according to the prior art and the sequential injection according to the invention.

DETAILED DESCRIPTION OF THE INVENTION

Figure 1:
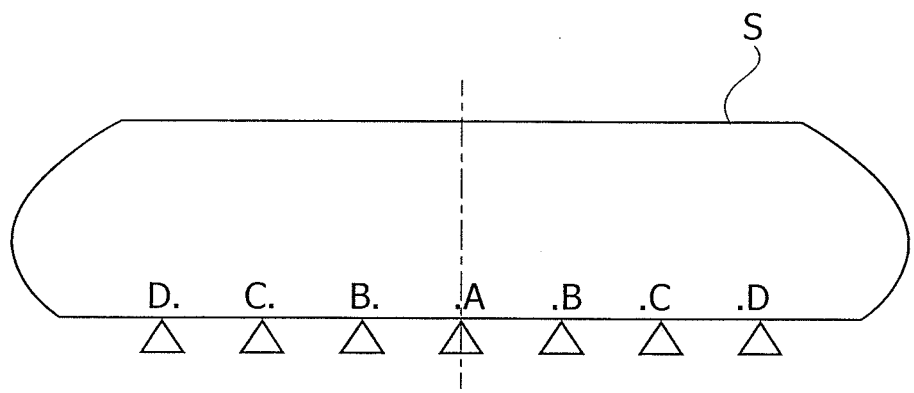
FIG. 1 schematically illustrates an article molded through sequential injection and the relative arrangement of the injectors.
Figure 2:
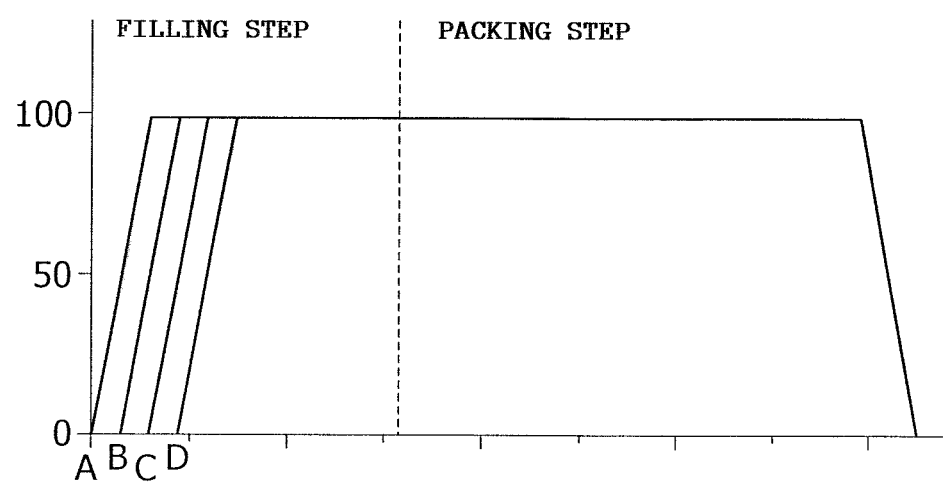
FIG. 2 is a diagram representing the sequential injection method according to the prior art.

FIGS. 1, 2 and 3 have been previously described in the introduction, with reference to the sequential injection cycle implemented according to the prior art.

The chart of FIG. 4 represents the distinctive methods for opening the injectors A, B, C, D obtained through the sequential injection molding apparatus according to the invention. It should be observed that, as explained previously, each injector is provided with a respective shutter pin which can be moved axially between a complete closing position and a complete opening position through a respective electrical actuator, for example a rotary electric motor of the type described and illustrated in the previously mentioned EP-2679374A1. The electric motor is in turn actuated through an electronic control unit configured to operate according to the principles of the invention.

For each injector A, B, C, D, the chart of FIG. 4 represents, as a function of time, the position of the relative shutter pin, indicated as a percentage of the complete opening position, from 0 to 100%.

As observable in the diagram at the beginning of the sequential injection cycle, the central injector A is opened first in a relatively rapid fashion, i.e. at a high movement speed of the respective shutter pin, up to a maximum value which may correspond to the complete opening or, like in the illustrated example, only to a partial opening in the order of 80% of the total opening. The injector A is then held in this opening position while the intermediate injectors B start opening, at a lower opening speed and up to a partial maximum opening value for example in the order of 30% with respect to the complete opening. Alternatively, and as represented in FIG. 4, the opening of the intermediate injectors B may also start after the central injector A has started closing. The central injector A is closed up to a minimum opening value, for example in the order of 20% with respect to the complete opening, and held at this minimum opening value during the filling step and the subsequent step of packing the plastic material in the mold S. In this step, or alternatively already during the step in which the central injector A is held in the maximum opening position, the intermediate injectors C and the end injectors D are opened in succession, at a lower movement speed of the respective shutter pins than the opening speed of the central injector A and possibly slightly higher than that of the intermediate injectors B, up to respective partial maximum opening values in the order of 40% or less. Depending on the shape of the article to be molded, these values may similarly or progressively increase, as indicated in FIG. 4, as the distance between the injectors C and D and the central injector A increases.

To complete the filling step, the injectors B, C and D are thus held at the aforementioned maximum partial opening values and then closed at respective minimum partial opening values during the entire packing step. These minimum partial opening values are slightly higher than the minimum partial opening value of the central injector A during the packing step, and progressively higher as the distance between the injectors B, C and D and the central injector A increases.

Upon completing the packing step, all injectors A, B, C and D are simultaneously completely closed.

In brief, the distinctive concepts of the invention may be summarized as follows:

the central shutter A, initially opened rapidly and then closed partially more slowly, should only remain partially open so as to limit the packing in the central areas of the mold cavity, the intermediate injectors B, C and end injectors D shall open at a lower speed than the speed of the central injector A, so as to avoid impacts between considerable amounts of plastic material in the mold cavity which may negatively affect the surface quality of the molded article, the speed and degree of opening of the intermediate injectors B, C and the end injectors D during the filling step preferably, but not necessarily, progressively increase as the distance from the central injector A increases, at the end of the filling step, the intermediate injectors B, C and the end injectors D shall be partially closed, possibly with progressively increasing closing speed as the distance from the central injector A increases, in the packing step, the partial opening of the central injector A, the intermediate injectors B, C and end injectors D should be kept unvaried up to the end of the cycle, and the opening value may progressively increase as the distance from the central injector A increases.

FIG. 5 shows the development of pressure in the mold cavity S with reference to the various injectors A, B, C, D: as observable compared to FIG. 3, the pressure increase is considerably more regular and linear during the filling step, and more homogeneous during the packing step. This leads to a drastic reduction or even total elimination of the surface defects of the molded article caused by the pressure lines.

Figure 6:
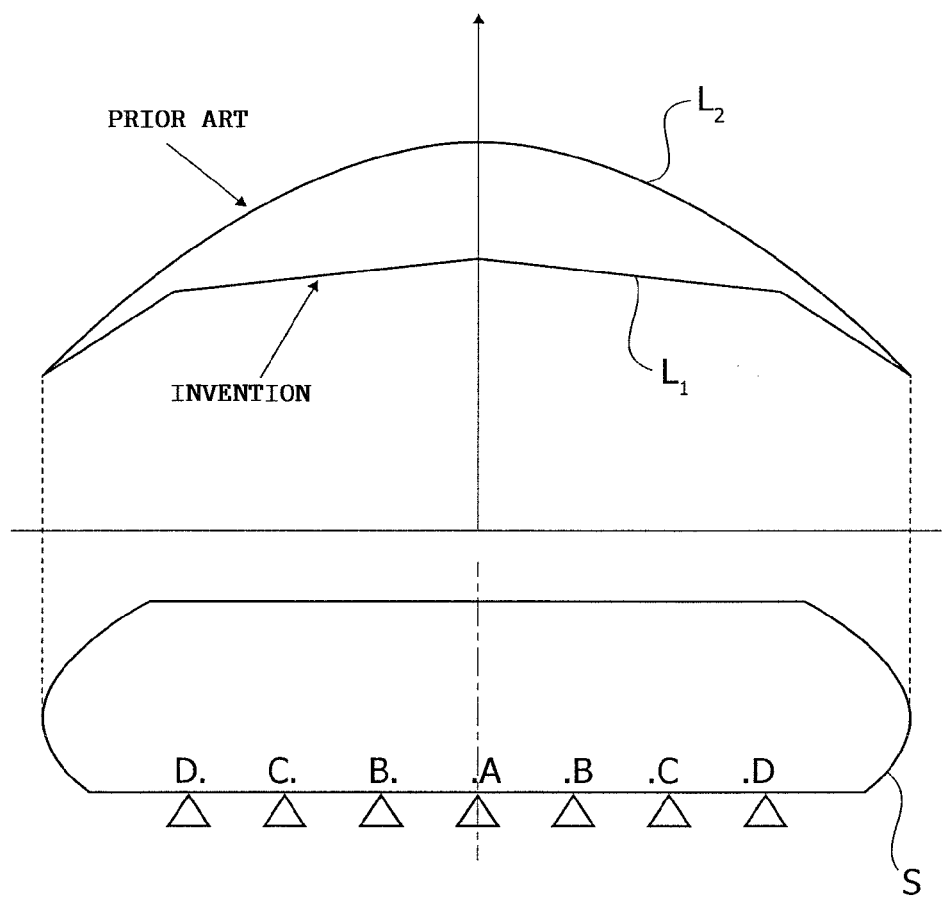

In addition, given that in the case of the invention the maximum packing pressure is lower than that of the prior art, there is further obtained the advantage of reducing the tonnage of the injection press of the molding apparatus, and thus considerably saving in terms of materials used in the construction of the mold. Such reduction of the packing pressure is observable in FIG. 6, in which the line L1 qualitatively represents the movement of the packing pressure in the mold cavity S that can be obtained with the apparatus according to the invention, compared to line L2 which indicates the same development of the prior art case. As observable, the packing pressure measured at the central injector A is, in the case of the invention, considerably low and lesser than the pressure observable in the prior art case, with the aforementioned advantages, and it is only slightly higher with respect to the packing pressure measured at the intermediate injectors B, C and end injectors D. At the same time, the development of the packing pressure should not be homogeneous along the entire length of the molded article, but the pressure corresponding to the central area of the article should, as mentioned, be slightly higher with respect to the pressure in the intermediate and end areas thereof.

Obviously, the construction details of the molding apparatus and operating method of the relative electronic control system may widely vary without departing from the scope of protection of the present invention as described in the claims that follow.

The invention claimed is:

1. A molding apparatus for the production of articles molded by sequential injection, comprising a mold having a cavity, a plurality of electrically actuated injectors including a central injector, intermediate injectors and end injectors arranged at central, intermediate and end positions, respectively, with respect to the mold cavity, and an electronic control system controlling the injectors for actuation thereof according to a sequential cycle which provides for opening the central injector first, followed by the intermediate injectors and then the end injectors, wherein said electronic control system is configured in such a way that:

the central injector is opened in a relatively rapid fashion up to a maximum opening value, then held at said maximum opening value, then partially closed to a minimum opening value and held at such minimum opening value, and the intermediate injectors and the end injectors are opened in succession in a less rapid fashion up to respective maximum opening values lower than said maximum opening value of the central injector and higher than said minimum opening value of the central injector, subsequently held at said respective maximum opening values until partially closed down to respective minimum opening values higher than said minimum opening value of the central injector and held at such minimum opening values until closing of the central, intermediate and end injectors.

2. The apparatus according to claim 1, wherein the maximum opening value of the central injector is lower than a complete opening of the central injector.

3. The apparatus according to claim 1, wherein the intermediate injectors and the end injectors are opened in succession respectively during and after partial closing of the central injector to said minimum opening value.

4. The apparatus according to claim 1, wherein partial closing of the central injector from the maximum opening value to the minimum opening value is carried out less rapidly than opening thereof to said maximum value.

5. The apparatus according to claim 1, wherein opening of the intermediate and end injectors up to the respective maximum opening values is carried out in a progressively more rapid fashion from the intermediate injectors to the end injectors.

6. The apparatus according to claim 1, wherein the maximum opening values of the intermediate and end injectors are progressively increasing from the intermediate injectors to the end injectors.

7. The apparatus according to claim 1, wherein the minimum opening values of the intermediate and end injectors are progressively increasing from the intermediate injectors to the end injectors.

8. The apparatus according to claim 1, wherein said minimum opening values of the injectors correspond to a packing step of the plastic material in the mold cavity, and wherein in said packing step, the pressure in the mold cavity at the central injector is low and only slightly higher than the pressure at said intermediate injectors and end injectors.

9. The apparatus according to claim 1, wherein complete closing of the injectors occurs simultaneously.

10. The apparatus according to claim 1, wherein the central injector is opened and partially closed during a filling step of the plastic material into the mold cavity and held at such partially closed position through a portion of the filling step and through a packing step of the plastic material in the mold cavity until closed; wherein the intermediate and end injectors are opened and held at their respective maximum opening values until an end of the filling step; and wherein after a transition from the filling step to the packing step, the intermediate and end injectors are partially closed down to and held at their respective minimum opening values until the central, intermediate and end injectors are simultaneously closed.

11. A molding method for the production of articles molded by sequential injection in a mold cavity by using a plurality of electrically actuated injectors including a central injector, intermediate injectors and end injectors arranged at central, intermediate and end positions, respectively, with respect to the mold cavity, wherein the injectors are actuated according to a sequential cycle providing for opening the central injector first, followed by the intermediate injectors and then the end injectors, wherein the method includes the following steps:

the central injector is opened in a relatively rapid fashion up to a maximum opening value, then held at said maximum opening value, then partially closed down to a minimum opening value and held at such minimum opening value, and the intermediate injectors and the end injectors are opened in succession in a less rapid fashion up to respective maximum opening values lower than said maximum opening value of the central injector and higher than said minimum opening value of the central injector, subsequently held at said respective maximum opening values until partially closed to respective minimum opening values higher than said minimum opening value of the central injector and held at such minimum opening values until closing of the central, intermediate and end injectors.

12. The method according to claim 11, wherein the maximum opening value of the central injector is lower than a complete opening of the central injector.

13. The method according to claim 11, wherein the intermediate injectors and the end injectors are opened in succession respectively during and after partial closing of the central injector down to said minimum opening value.

14. The method according to claim 11, wherein partial closing of the central injector from the maximum opening value to the minimum opening value is carried out less rapidly than opening thereof to said maximum value.

15. The method according to claim 11, wherein opening of the intermediate and end injectors up to the respective maximum opening values is carried out in a progressively more rapid fashion from the intermediate injectors to the end injectors.

16. The method according to claim 11, wherein the maximum opening values of the intermediate and end injectors are progressively increasing from the intermediate injectors to the end injectors.

17. The method according to claim 11, wherein the minimum opening values of the intermediate and end injectors are progressively increasing from the intermediate injectors to the end injectors.

18. The method according to claim 11, wherein said minimum opening values of the injectors correspond to a packing step of the plastic material in the mold cavity, and wherein in said packing step, the pressure in the mold cavity at the central injector is low and only slightly higher than the pressure at said intermediate injectors and end injectors.

19. The method according to claim 11, wherein complete closing of the injectors occurs simultaneously.

* * * * *